US008653148B2

(12) United States Patent
Cha

(10) Patent No.: US 8,653,148 B2
(45) Date of Patent: Feb. 18, 2014

(54) MICROWAVE PROCESS AND APPARATUS FOR BREAKING EMULSIONS

(75) Inventor: Chang Yul Cha, Laramie, WY (US)

(73) Assignee: C-Micro Systems Inc., Saint Lazare, Quebec (CA)

( * ) Notice: Subject to any disclaimer, the term of this patent is extended or adjusted under 35 U.S.C. 154(b) by 434 days.

(21) Appl. No.: 12/910,116

(22) Filed: Oct. 22, 2010

(65) Prior Publication Data

US 2011/0136923 A1 Jun. 9, 2011

Related U.S. Application Data

(60) Provisional application No. 61/254,407, filed on Oct. 23, 2009.

(51) Int. Cl.
*B01D 17/04* (2006.01)
*B01J 19/08* (2006.01)
*C10G 1/00* (2006.01)
*C02F 1/30* (2006.01)

(52) U.S. Cl.
USPC ........... 516/194; 516/138; 208/188; 210/694; 210/708; 210/748.07; 204/157.15

(58) Field of Classification Search
USPC .......... 516/138, 194; 208/187, 188, 402, 132, 208/172; 210/708, 748.07, 694; 204/157.15
See application file for complete search history.

(56) References Cited

U.S. PATENT DOCUMENTS

| | | | | |
|---|---|---|---|---|
| 4,853,119 A * | 8/1989 | Wolf et al. | ..................... | 210/181 |
| 4,853,507 A * | 8/1989 | Samardzija | ................... | 219/696 |
| 5,068,030 A * | 11/1991 | Chen | ................................ | 210/95 |
| 6,184,427 B1 * | 2/2001 | Klepfer et al. | ................ | 585/241 |
| 6,187,988 B1 * | 2/2001 | Cha | .......................... | 210/748.07 |
| 6,440,312 B1 * | 8/2002 | Kasevich | ................. | 210/748.01 |
| 7,303,684 B2 * | 12/2007 | Cha | ................................ | 210/694 |
| 2004/0031731 A1 * | 2/2004 | Honeycutt et al. | ............ | 208/402 |
| 2005/0024284 A1 * | 2/2005 | Halek et al. | ................... | 343/771 |
| 2005/0154248 A1 * | 7/2005 | Cha | ................................ | 588/310 |
| 2008/0023401 A1 * | 1/2008 | Arato et al. | .................... | 210/662 |
| 2008/0221226 A1 * | 9/2008 | Coutinho et al. | ............ | 516/194 |
| 2009/0101592 A1 * | 4/2009 | Anderson et al. | ............. | 210/748 |
| 2010/0288494 A1 * | 11/2010 | Khan et al. | ................... | 166/265 |
| 2011/0114470 A1 * | 5/2011 | Cha et al. | ................... | 204/157.15 |
| 2012/0108879 A1 * | 5/2012 | Cha et al. | ..................... | 588/310 |
| 2013/0161259 A1 * | 6/2013 | Moliere | ......................... | 210/665 |
| 2013/0213795 A1 * | 8/2013 | Strohm et al. | ........... | 204/157.15 |

OTHER PUBLICATIONS

Challa et al, "Measurement of the Dielectric Properties of Char at 2.45 GHz", Journal of Microwave Power and Electromagnetic Energy (JMPEE), vol. 29, Iss. 3, pp. 131-137 (1994).*

* cited by examiner

*Primary Examiner* — Daniel S Metzmaier
(74) *Attorney, Agent, or Firm* — Bachman & LaPointe, P.C.

(57) ABSTRACT

A oil and water emulsion breaking system having a reactor including an inner vessel connected to an inlet and an outlet of the reactor and allowing microwaves to pass therethrough, a packed bed of activated carbon retained within and across the inner vessel along at least part of a length thereof and configured for circulation of the emulsion therethrough, and a microwave applicator configured to direct microwaves to the packed bed through the inner vessel.

6 Claims, 6 Drawing Sheets though it is found to be a good oil recovery method for tank bottom oily sludge. Thermal methods use heating in order to reduce the viscosity and to break the emulsion. While useful, thermal methods are usually very slow and require a lot of energy.

MICROWAVE PROCESS AND APPARATUS FOR BREAKING EMULSIONS

CROSS-REFERENCE TO RELATED APPLICATIONS

This application claims priority on provisional application No. 61/254,407 filed on Oct. 23, 2009, the entire content of which is incorporated by reference herein.

FIELD OF THE INVENTION

The present application relates to the breaking of emulsions, more particularly to breaking oil-water and oil-water-solid emulsions.

BACKGROUND ART

Canadian oil sands are a combination of clay, sand, water, and bitumen, heavy black viscous oil. Oil sand, as mined commercially, typically contains an average of 10-12% bitumen, 83-85% mineral matter and 4-6% water. The hot water extraction process is a common commercial process used for extracting bitumen from mined oil sands. Almost all of the water withdrawn for oil sand operations usually ends up in tailings ponds. Both primary and final extraction plant tailings are pumped to a retention pond for storage.

When these effluent streams containing bitumen, naphtha, water, and solids are discharged to the pond, a portion of the residual bitumen and diluents naphtha floats to the surface of the pond. The dense sand fraction present in the primary stream typically settles rapidly but the lighter solid fines suspension in water usually settles very slowly, forming a zone of sludge. After a period of settling a shallow layer of relatively clear water develops near the surface of the pond. Water from this layer is usually recycled to the extraction process. But the majority of water remains in this sludge, a water-bitumen-fine solids emulsion that is very difficult to break. The water-bitumen-fine solids emulsion needs to be broken to separate this sludge into the bitumen, fine solids, and water.

Refineries produce products from ever increasing number of different feed stocks, for example sweet crude, sour crude, asphaltic crude and aliphatic crude, and emulsion problems can develop with the solids, oil and water that find their way into the oil-water separator. The separator may produce a crude outlet stream of a high level of emulsion, which the emulsion being usually skimmed-off and moved into a holding tank. Usually, the water is moved from the holding tank to a sour water stripper and the oil is routed back to either a crude charge tank or directly to the feed into a crude unit on its way to desalters. These streams tend to put major stress on the desalters and in turn on main fractionators at the crude unit.

Another area of concern for breaking down emulsions in a refinery is at the level of the tank farm. Throughout the refinery, different process streams deposit solids, oil and water on the bottoms of the tanks in what is termed as sludge. This sludge is typically high in solids of mostly inorganic compounds. The oil and water are usually bound very tightly with these solids, forming an emulsion that does not allow for an easy separation. When the levels of this sludge become too high in the tanks, they must be cleaned. However, if the emulsion cannot be separated, it becomes hazardous waste that can only be disposed of at high cost.

Emulsions may also problematic in bilge water of big ships such as Navy ships. Bilge water is a collection of different streams that collect at the lowest point in the ship. The bilge water contaminants usually include oil, non-ionic detergents, commercial laundry detergents, cleaners, solvents, suspended solids and dissolved solids. Typical values for oil and grease content in the bilge water may range between 100 and 10,000 ppm, which is well above a typical discharge limit of e.g. 15 ppm. The oil and water are immiscible, and when sufficient mechanical energy is added to the mixture, a stable oil-in-water emulsion may form. The bilge water emulsions are composed of oil droplets dispersed in water and may also contain smaller droplets of the continuous water phase dispersed within each droplet of the dispersed oil phase, yielding what is known as a double emulsion. Among the contaminants, the nonionic detergents, commercial laundry detergents and cleaners are emulsifying agents. The mixture of these emulsifying agents is more effective than a single emulsifying agent in forming a complex at the interface between the oil and water, resulting in a low interfacial tension and a strong interfacial film (Schramm, L. L., Ed., "Emulsions Fundamentals and Applications in the Petroleum Industry", Published by American Chemical Society, Washing, DC, 1992) around the oil droplets. Lowering the interfacial tension makes it easier to create small oil droplets that do not coalesce to form larger droplets. The presence of different emulsifying agents in the bilge water stabilizes these emulsions. Dissolved and suspended solids in bilge water also contribute to the stabilization of oil-in-water emulsions. In order to break the oil-in-water emulsions in the bilge water, the detergent or surfactant thin films around the oil droplets must be broken so that the oil droplets undergo coalescence.

Because of the strong, thin surfactant films around the oil droplets, gravitational separation is typically not practical for removing small droplets from bilge water in a reasonable amount of time. The rupture of the metastable thin film is a thermally activated process, which proceeds through the opening of a tiny, molecular-sized hole that grows further under the action of surface tension. Since the presence of various detergents lowers the surface tension, thermal methods are not very effective for breaking oil-in-water emulsions in bilge water (Karlsruhe, G. H., Ed., "Emulsion Sciences, Basic Principles and an Overview", Published by Physics and Astronomy, Springer, New York, N.Y., 2002). Chemicals used for breaking oil-in-water emulsions are sensitive to changes in the emulsion composition, limiting their effectiveness in treating bilge water (Colbert, J. C., Ed., "Foam and Emulsion Control Agents and Processes", Published by Noyes Data Corporation, Park Ridge, N.J., 1981). Even if a robust demulsifier is available, it is generally undesirable to transport the material to sea. Electrolytic treatment systems have many undesirable attributes, including the need to maintain a stable pH, potential short circuiting, frequent electrode replacement, and the formation of an oil containing sludge that requires further treatment.

Accordingly, improvements are desirable in the treatment of emulsions, particularly oil-water emulsions.

SUMMARY

It is therefore an aim of the present invention to provide an apparatus and a process for breaking emulsions containing oil and water.

In one aspect of the invention, there is provided a system for breaking an emulsion containing at least oil and water, the system comprising a reactor including an inner vessel connected to an inlet and an outlet of the reactor and allowing microwaves to pass therethrough, a packed bed of activated carbon retained within and across the inner vessel along at least part of a length thereof and configured for circulation of the emulsion therethrough, and a microwave applicator configured to direct microwaves to the packed bed through the inner vessel.

In another aspect of the present invention, there is provided a process for breaking an emulsion containing at least oil and water, the process comprising circulating the emulsion through a packed bed comprising activated carbon, and applying microwaves to the emulsion as it is circulated through the packed bed to produce a treated mixture.

BRIEF DESCRIPTION OF THE DRAWINGS

Reference will now be made to the accompanying drawings, showing by way of illustration a particular embodiment of the present invention and in which.

DETAILED DESCRIPTION OF PARTICULAR EMBODIMENTS

Figure 1:
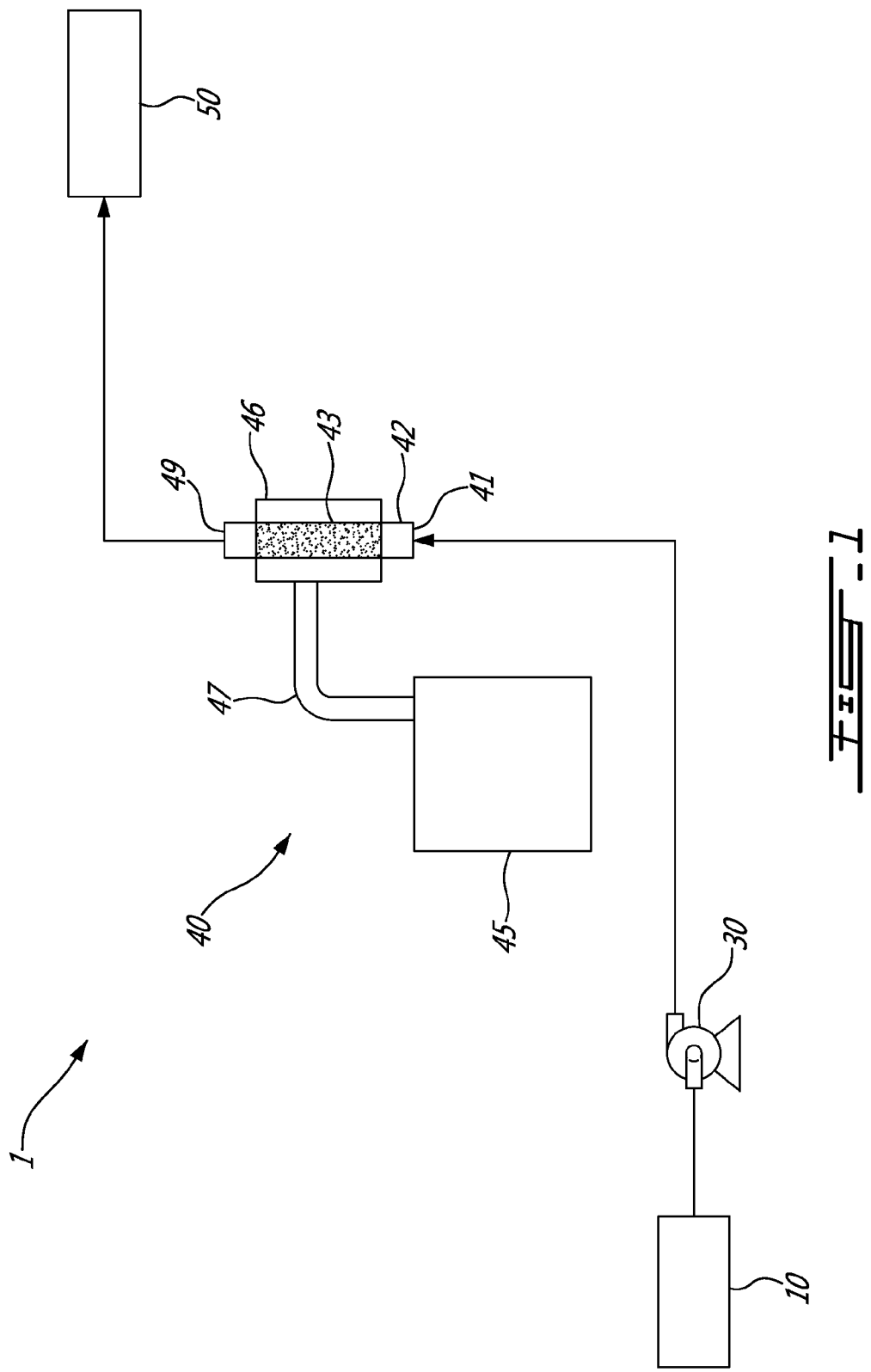
FIG. 1 is a schematic representation of a microwave reactor system for breaking emulsions according to one embodiment of the present invention.

An emulsion is defined as a system comprising at least one liquid dispersed in at least a second immiscible liquid. The two liquids are combined together and are dispersed in one another. Examples of such emulsions include oil-water emulsions. In the present specification, "oil" is intended to encompass any substance that is liquid at ambient temperatures and is hydrophobic but soluble in organic solvents, including but not limited to organic oil, e.g. vegetable and animal oil and mineral oil e.g. petrochemical oil such as bitumen.

The emulsions may also include small quantities of natural emulsifiers that further stabilizes the emulsion by maintaining an interface layer between the two liquid phases, e.g. between the oil and water.

An emulsion containing oil and water may also be an oil-water-solid emulsion, thus including oil, water and a solid particulate component. The oil-water-solid emulsion may take any number of forms. However, a common form of the oil-water-solid emulsion has a central particulate core, having a relatively small size particle such as sand, silt or clay. The solid particulate may have an average diameter of, for example, 0.001 to 1 mm. In oil refinery sludges found in the bottom of tanks, the central particulate is typically surrounded by an oily layer, of tar or bitumen or similar thicker product. This oily layer includes a thin and stable outer coating of water. Alternately, the solid particulate core may have an adjacent water layer and an outer oily layer.

Thus, for oil-water and oil-water-solids emulsions, the emulsion can be of the oil-in-water (O/W) type or of the water-in-oil (W/O) type. In an oil-in-water emulsion, oils droplets are dispersed in a substantially continuous (aqueous) water phase, while a water in oil emulsion comprises water droplets in a substantially continuous oil phase. W/O emulsions are commonly produced for lotions such as sun screens that claim to be waterproof. Many hydrocarbon refinery sludges are of the W/O variety and are not easily washed out by water alone.

The stability of an emulsion derives from the nature of an interlayer where the immiscible liquids (e.g. oil and water) meet. The interlayer is usually not homogenous and may include various fractions that have small quantities of emulsifying agents. These emulsifying agents can include surfactants such as detergents. Detergents stabilize the interlayer between oil and water because they include a hydrophobic end (aligning with the aqueous phase) and a hydrophilic end (aligning with the oil phase). Detergents within the interlayer between oil and water consequently increase the stability of the oil-water or oil-water-solid emulsion.

Breaking an oil-water or oil-water-solid emulsion is defined as the separation of the components (oil, water, and solid if applicable) into their respective phases. This is achieved by breaking the interlayer between the oil and the water phases of the emulsion, and for oil-water-solid emulsions, additionally breaking the similar layer found at the boundary of the particulate solid layer with the oil and/or the water phase. Once the emulsion is broken, the separate components are allowed to collect and are withdrawn.

It has been discovered that microwave energy, when combined with activated carbon, breaks the thin surfactant films around the oil droplets, decreasing the emulsion stability and enhancing coalescence. Water absorbs microwave energy much more efficiently than hydrocarbons, and physical properties such as viscosity can be preferentially altered. This phenomenon can be harnessed to decrease the stability of an emulsion. Furthermore, the activated carbon and preferably granulated activated carbon (GAC) acts as a catalyst to destroy detergents and solvents when coupled with microwaves, and further enhances the breaking of the oil-water and oil-water-solid emulsions by providing a hydrophobic medium with a high surface area on which oil droplets may collect and coalesce. Such a process can be applied to oil-water and oil-water solid emulsions produced by refineries, found in bilge water, in tailing ponds from hot water extraction of oil sand, etc.

When microwave energy is applied to an oil-water-solid or oil-water emulsion flowing through a GAC bed, the carbon quickly absorbs microwave energy and changes the interfacial properties of the emulsion. The carbon provides the contact area and initiates microwave-induced reactions of surfactant molecules with carbon, which breaks thin films around oil droplets. Microwave energy also enhances the reaction of carbon with oxygen atoms contained in detergent molecules, destroying the detergents in the emulsion. Oil droplets are captured by GAC and either recovered or destroyed by microwave energy. The microwave energy combined with GAC bed not only destabilizes the emulsions but may also decomposes detergent and oil molecules to gaseous compounds. Microwaves cause the water molecules in the emulsion to oscillate and thus disrupt the stability of the emulsion. In the case of bilge water, the use of dual GAC beds, one working as a microwave reactor and the other working as an adsorber, removes organic compounds including oil, nonionic detergents, commercial laundry detergents, cleaners, and solvents.

The terms microwaves or microwave energy are understood to apply to a broad range of radiofrequency energies particularly with respect to the common heating frequencies, 915 MHz and 2450 MHz. The former is often employed in industrial heating applications while the latter is one frequency of common household microwave ovens and therefore represents a good frequency to excite water molecules. In the present application the term "microwave" or "microwaves" is generally employed to represent "radiofrequency energies selected from the range of about 500 to 5000 MHz", although in practice frequencies of 915 and 2450 MHz are preferably used in order to comply with Federal Telecommunication regulation.

Referring now to FIG. 1, a microwave reactor system 1 according to a particular embodiment of the present invention includes at least one reactor 40 that facilitates the separation of the components of an emulsion. The system 1 includes a tank 10 containing the emulsion to be treated. The tank 10 is connected to a pump 30, which is connected to the reactor 40 via appropriate tubing or piping. In a particular embodiment the pump 30 is one where the emulsion is pumped as gently as possible, to minimize the further dispersion of the emulsion into even finer particles, such as a progressing cavity positive displacement pump or a peristaltic pump. In embodiments where the emulsion is relatively strong and further dispersion is not a concern, a number of adequate types of pumps may alternately be used.

The reactor 40 includes an internal vessel 42 with walls that allow for the passage of microwaves therethrough. In a particular embodiment, the internal vessel 42 is a quartz tube. The internal vessel 42 defines an internal channel including a packed activated carbon bed 43 extending thereacross. The internal channel of the vessel 42 defines an inlet 41 and an outlet 49 including appropriate filtering elements (e.g. screens, perforated plates) that retain the activated carbon while allowing the passage of the emulsion through the packed bed 43. The inlet 41 is in fluid communication with the pump 30, while the outlet 49 is in fluid communication with a collecting element 50, for example a tank.

The reactor 40 further includes a microwave applicator 46 which receives microwaves generated by a microwave source 45, e.g. a magnetron, via a waveguide 47 and directs the microwaves to the vessel 42, and more particularly to the packed bed 43. In an alternate embodiment, the microwave applicator 46 is directly connected to the microwave source 45, i.e. the waveguide 47 is omitted. In the embodiment shown, the microwave applicator 46 extends concentrically around the vessel 42, and surrounds the packed bed 43 along its entire length. The microwave applicator 46 may also extend along the entire length of the vessel 42.

In a preferred embodiment, the activated carbon of the packed bed 43 is a pelletized or granulated activated carbon (GAC). Various adequate types of activated carbon pellets may be used. In a particular embodiment, the activated carbon also includes a small percentage of metallic oxides, such as iron and aluminum.

In use, the system 1 is used to break an oil-water or oil-water-solid emulsion which is brought from the tank 10 to the reactor 40 by the pump 30. The emulsion is circulated in the vessel 42 through the packed bed 43 while being exposed to microwaves directed by the applicator 46 and passing through the vessel 42. When the activated carbon is exposed to the microwave radiation, the microwaves cause the activated carbon to be agitated and likely fluidize the packed bed 43 while the emulsion is being circulated therethrough, thus reducing the pressure drop of the emulsion through the packed bed 43. As mentioned above, the microwaves destabilize the emulsion to facilitate the separation of its components. The treated emulsion leaves the reactor 40 from the outlet 49 and is collected in the collecting element 50, where the treated emulsion settles with its components at least partially separated from one another.

Figure 2:
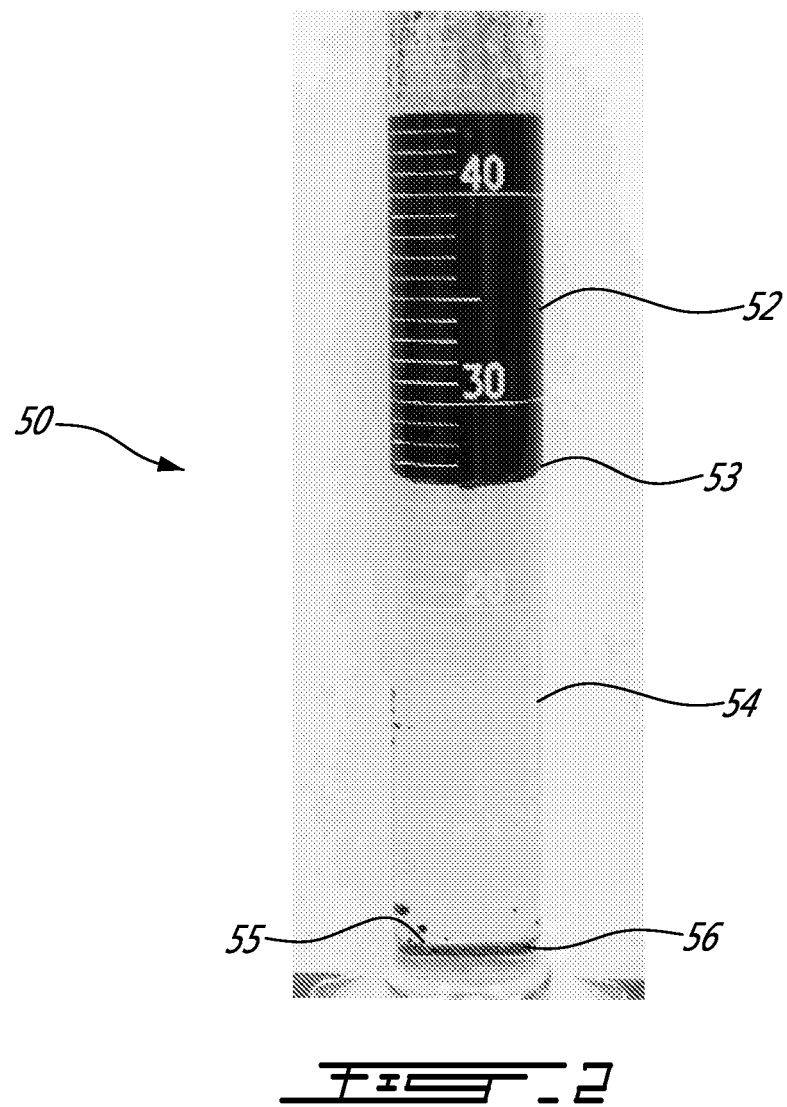
FIG. 2 is a photograph of a sample of a solution after treatment through a microwave reactor system such as shown in FIG. 1.

A preliminary experiment was conducted on a crude oil-water-solid emulsion using a system such as shown in FIG. 1. The internal vessel 42 was a quartz tube with an 11/16 inch diameter. The activated carbon of the packed bed 43 was in the form of ½ inch diameter cylinders and contained a small percentage of metallic oxides. The collecting element 50 was a graduated cylinder, which is shown in FIG. 2. The oil-water-solid emulsion was obtained from the Frontier Refiner in Cheyenne, Wyo. The composition of the emulsion was approximately 40% oil, 45% water and 15% solids by weight.

During application of the microwaves to the packed bed 43, sparks were generated within the activated carbon. These sparks were believed to originate at the metallic oxides of iron or aluminum within the carbon, and appeared to activate the emulsion interlayer and further disturb the stability of the emulsion promoting the breakage of the emulsion by likely destroying emulsifying agents such as detergents or other surfactants.

As can be seen in FIG. 2, the treated emulsion has undergone a process that has broken the emulsion solution. The oil component 52 is found above and clearly separated from the water component 54, while a solid phase component 56 is clearly visible at the bottom of the cylinder 50. FIG. 2 also shows a clear interface or interfacial layer 53 between oil and water, and a further interface 55 between the water 54 and solid components 56.

Other preliminary experiments were performed using a system such as shown in FIG. 1, using different oil-in-water emulsions. The microwave source 45 was a generator having power adjustable between 0 and 6 kW at a fixed frequency of 2450 MHz. The internal vessel 42 was a 2.36 inch diameter quartz tube, 24 inches in length, located inside a ¼ inch diameter copper helix, which served as a non-resonant cavity. The packed bed 43 was a 6 cm GAC bed. As the material in the reactor is heated, dielectric properties change, thus causing the impedance to change with time. A tuner was adjusted to compensate for these changes.

The first oil-in-water emulsion was obtained using 100 mL of motor oil, 20 mL of car-wash soap and 20 L of tap water, for an approximate 5000 ppm oil content if the oil is completely mixed with the water. The solution was stirred for 2.5 hours to create a milky oil-in-water emulsion, and the total organic carbon (TOC) content of the solution was measured at 800 ppm, which indicated that some of the oil was not completely mixed into the solution. The solution was pumped through the packed bed 43 at the rate of 16 liter per hour, while a microwave power of 600 W was applied to the reactor 40. The total organic carbon content of the treated solution was reduced to 200 ppm. The solution was recycled a second time through the packed bed 43 while a microwave power of 600 W was applied to the reactor 40, and the total organic carbon content of the solution was reduced to 28 ppm. The milky color disappeared and the solution looked clear, which indicates that reactor 40 completely broke the oil-in-water emulsion. Also, no trace of oil was observed in the treated solution.

The second oil-in-water emulsion was obtained using 150 mL of JP-8 fuel, 30 mL of Tide liquid laundry detergent, 400 g of rock salt and 20 L of tap water. The rock salt was added to the solution to simulate the sea water in bilge water, while the JP-8 was used to represent a marine diesel fuel. The mixture was stirred for 4.5 hours to make a milky oil-in-water emulsion and allowed to settle for a couple of days. The TOC content of this aqueous solution was measured at 2,737 ppm. The experimental procedure used in the first test was repeated in this experiment, but with 1 kW microwave power. The TOC content of the solution after one circulation through the reactor 40 was reduced to 450 ppm, which represents 84% TOC removal efficiency. The solution was then recycled through the reactor 40 for a second pass, which reduced the bulk TOC content to 129 ppm, for a second cycle TOC removal of 71%. Overall, the two passes through the reactor 40 allowed for a TOC removal of 95%.

The third oil-in-water emulsion was obtained using the same components in the same proportions as the second emulsion, but a higher TOC content of 3,700 ppm was measured. The experimental procedure used in the first test was repeated in this experiment, including the 600 W microwave power. The TOC content of the solution was reduced from 3,700 ppm to 1,378 ppm (63% removal efficiency) after the first cycle and to 611 ppm (83% removal efficiency) after the second cycle. Reducing microwave power from 1 kW to 600 W thus reduced the TOC removal efficiency.

Figure 3:
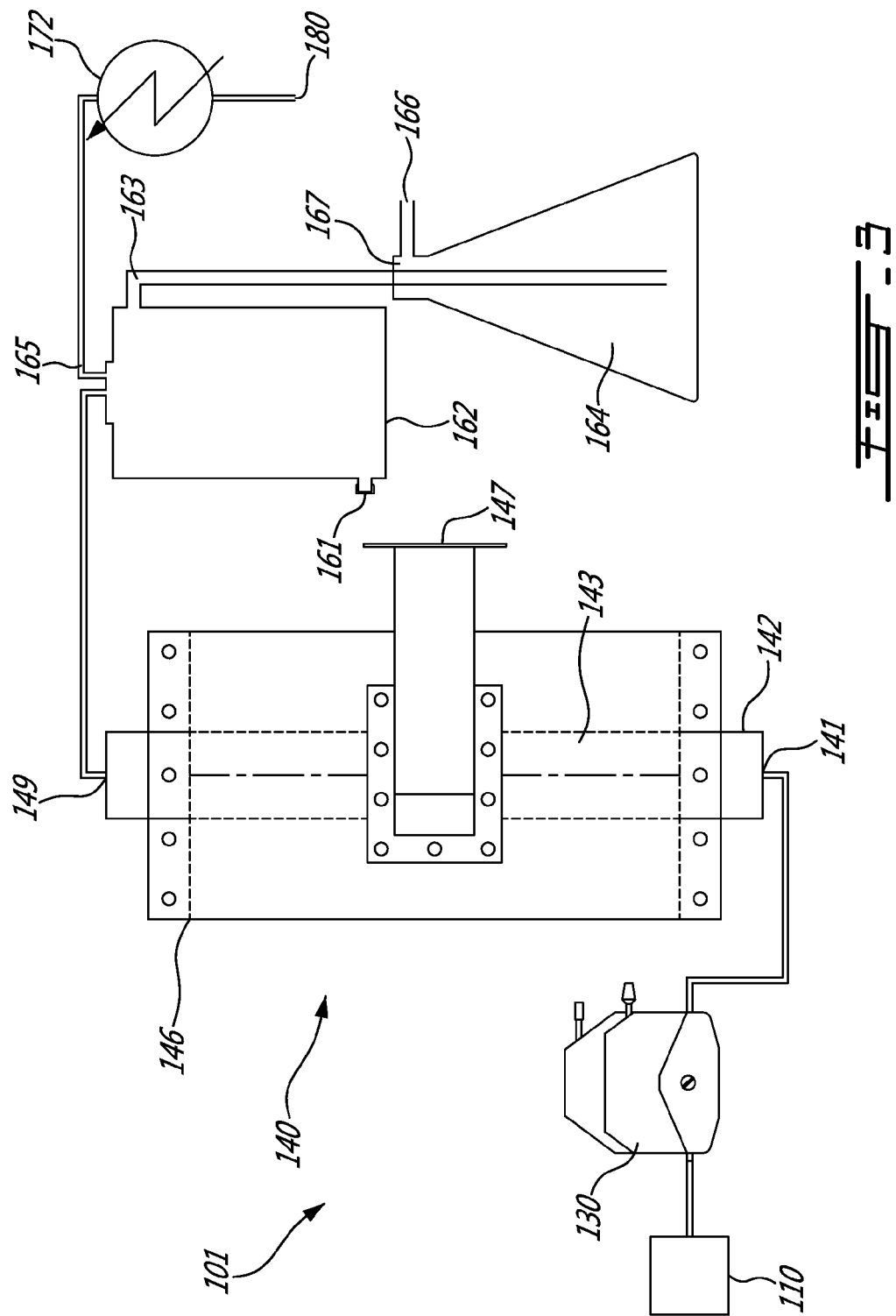
FIG. 3 is a schematic representation of a microwave reactor system for breaking emulsions according to another embodiment of the invention.

FIG. 3 shows a microwave reactor system 101 according to another particular embodiment. The system 101 includes an emulsion breaking reactor 140 with an inner vessel 142 made of material that allow for the passage of microwaves therethrough, which in a particular embodiment is quartz. The vessel 142 is contained in a microwave applicator 146. A microwave generator (not shown) supplies microwave power to the applicator 146 through a centrally located waveguide 147. The vessel 142 includes a packed coal char bed 143 extending thereacross. A pump 130 such as a peristaltic pump is connected to a source 110 of emulsion, for example a tank, and to an inlet 141 of the vessel 142.

The system 101 further includes an upper settling tank 162 in fluid communication with an outlet 149 of the vessel 142. The upper tank 162 includes an overflow outlet 163 defined through a top portion of a side wall thereof, and a bottom outlet 161 defined through a bottom portion of a side wall thereof. The upper settling tank 162 further includes a vapor outlet 165 defined through a top wall thereof, in fluid communication with a condenser 172 having a liquid outlet 180.

The system 101 further includes a lower settling tank 164 having an inlet 167 defined at the top thereof and in fluid communication with the overflow outlet 163 of the upper settling tank 162. The lower settling tank also includes an upper outlet 166 defined through a top portion of a side wall thereof.

In use, the pump 130 circulates the emulsion from the source 110 and through the packed bed 143 in the vessel, while the coal char is activated by the microwaves distributed by the applicator 146. The microwaves heat the emulsion passing through the vessel 142 and in particular through the packed bed 143, while the emulsion is being broken. The treated emulsion then exits through the outlet 149 and is received in the upper settling tank 162, where the treated emulsion is given time to allow the components (oil, water and, if applicable, solids) to separate or decant. Vapor is extracted from the upper settling tank 162 through the vapor outlet 165 and circulated to the condenser 172 to be condensed to a liquid which may be extracted through the liquid outlet 180.

The oil component is transferred to the lower settling tank 164 through the overflow outlet 163 for further separation. Water, and solids if present, may be extracted through the bottom outlet 161.

Further separation of oil and water is performed in the lower settling tank 164, and the most clarified oil may be extracted through the upper outlet 166.

Bench tests were conducted using a microwave reactor system such as shown in FIG. 3, by varying emulsion flow rates (USGPH) of the pump 130 through the vessel 142. The vessel 142 was a quartz tube with a 3 inch diameter. The microwave generator was a variable microwave generator which supplied 2,450 MHz microwave power to the applicator 146. The packed bed 143 was packed with ½ inch diameter coal char. The same emulsion used in the previously described experiment was used, i.e. with a composition of approximately 40% oil, 45% water and 15% solids by weight.

Samples were withdrawn from the upper settling tank 162 at four different height levels thereof from top to bottom, particularly at the top 25%, second 25%, third 25%, and bottom 25%. The samples were analyzed for oil, water and solid contents for each of the different flowrates (1.5, 2, and 3 USGPH). Results are presented in Table 1.

As is seen in Table 1, the top 25% of the liquid contained in the settling tank 162 was 100% oil for all four experimental flowrates. It was also noted that the oil concentration of liquid decreased as the liquid depth increased. Furthermore, the separation of oil from the mixture increased as the microwave power increased. Table 1 indicates clearly that efficient emulsion breakage of oil-water-solid emulsions is possible in a microwave-carbon reactor. The results found in Table 1 also indicate that the use of a conventional separator such as hydro-cyclone as a collecting element 50 in series with the reactor 140 would be effective in separating the components of the treated oil-water-solids emulsion, since in a hydro-cyclone the top flow contains low density fluid, mainly oil, and the bottom flow contains high density fluid, water or solids.

TABLE 1

Microwave Bench-Scale Test Results

| Run Number | Microwave Power, kW | Liquid Flow Rate, USGPH | Sample Location | Oil wt % | Water wt % | Solid wt % |
|---|---|---|---|---|---|---|
| | | | Feed | 40 | 45 | 15 |
| 1 | 3 | 1.5 | Top 25% | 100 | 0 | 0 |
| | | | Second 25% | 57 | 24 | 19 |
| | | | Third 25% | 24.5 | 51 | 24.5 |
| | | | Bottom 25% | 5 | 81 | 14 |
| 2 | 3 | 2 | Top 25% | 100 | 0 | 0 |
| | | | Second 25% | 34 | 39 | 27 |
| | | | Third 25% | 25 | 51 | 24 |
| | | | Bottom 25% | 12 | 69 | 19 |
| 3 | 3 | 3 | Top 25% | 100 | 0 | 0 |
| | | | Second 25% | 72 | 15 | 13 |
| | | | Third 25% | 19 | 59 | 22 |
| | | | Bottom 25% | 11 | 70 | 19 |
| 4 | 4 | 3 | Top 25% | 100 | 0 | 0 |
| | | | Second 25% | 89 | 6 | 5 |
| | | | Third 25% | 35 | 33 | 32 |
| | | | Bottom 25% | 7 | 68 | 25 |

Figure 4:
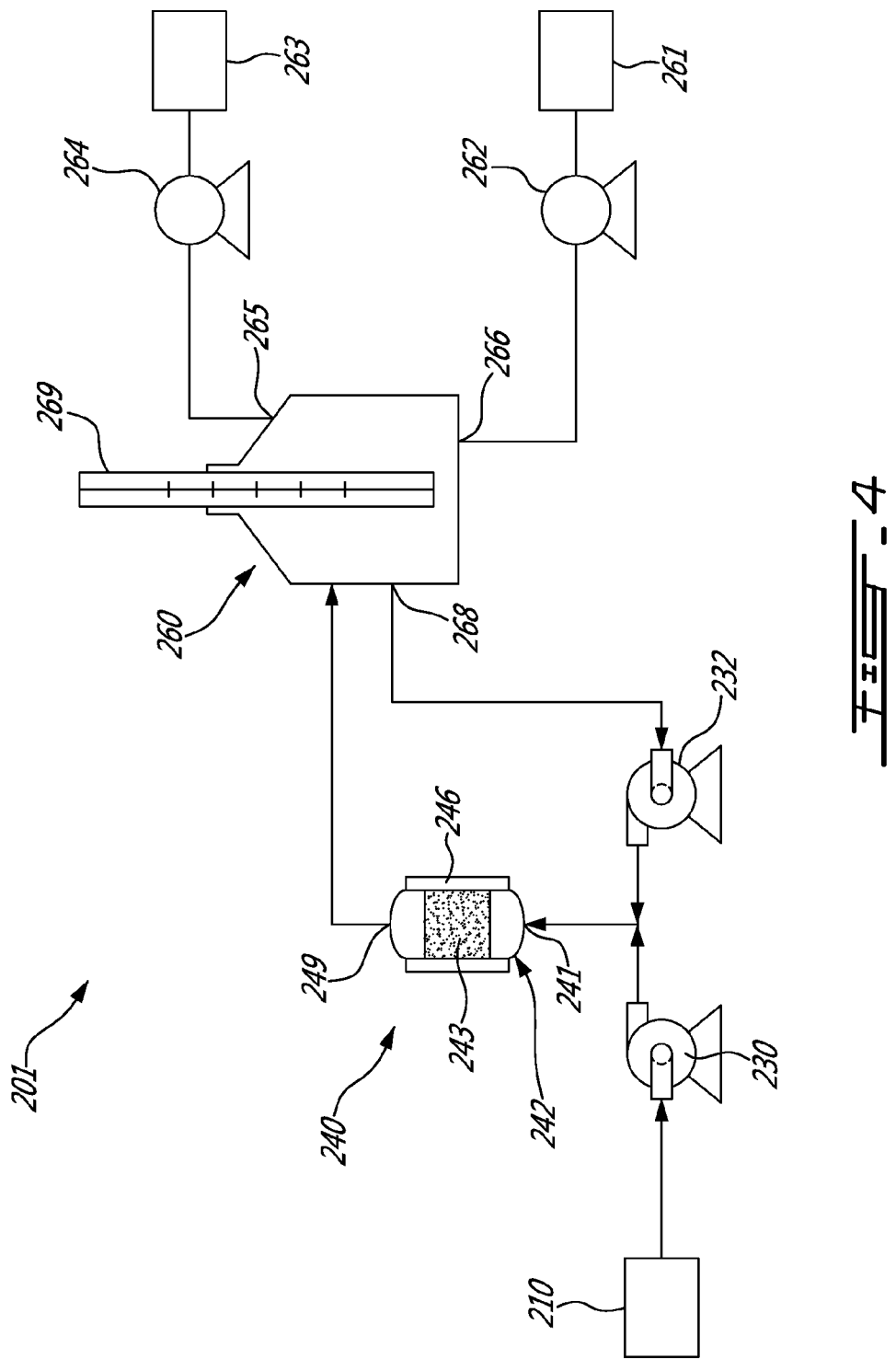
FIG. 4 is a schematic representation of a microwave reactor system for breaking emulsions according to a further embodiment of the invention.

FIG. 4 shows a microwave reactor system 201 according to another particular embodiment of the present invention. The system 201 includes a pump 230 in fluid communication with a source 210 of emulsion, such as for example a storage tank, and with a microwave reactor 240.

The reactor 240 includes a vessel 242 made of a material letting microwaves passed therethrough and having an inlet 241 in fluid communication with the pump 230. The vessel 242 contains a packed carbon bed 243 and is located inside a microwave applicator 246 which receives microwaves from a microwave source (not shown). The vessel 242 also includes an outlet 249 in fluid communication with a settling tank 260.

The settling tank 260 includes a microwave applicator 269 extending in the center of the tank 260, and directing microwaves to the treated mixture received therein. The settling tank 260 includes a top outlet 265 in fluid communication with a storage tank 263 through a pump 264, and a bottom outlet 266 in fluid communication with a waste storage tank 261 through a pump 262. The settling tank 260 further includes an intermediary outlet 268 spaced apart from the bottom and the top of the tank 260, in fluid communication with a pump 232 which is also in fluid communication with the inlet 241 of the vessel 242. For greater security a blanket of inert gas, usually nitrogen, is maintained above the liquid in the tank 260.

In use, the emulsion is circulated through the vessel 242 and packed carbon bed 243 from the source 210 by the pump 230. The emulsion is treated with a dosage of microwaves by the applicator 246 while flowing through the packed carbon bed 243. The treated mixture is then circulated to the setting tank 260, where the microwave applicator 269 provides a further dose of microwaves to the mixture, facilitating the separation of the oil and water components as well as the solid component, if present, one from the other.

Once the mixture has settled in the tank 260, the top layer thereof is primary oil, which is pumped from the outlet 265 by the pump 264 to the oil storage tank 263.

Even after treatment through the reactor 240 some of the treated emulsion may remain non-coalesced as a mixture of oil, water, and optionally solids, still partially emulsified. This non-coalesced portion of the treated emulsion is found at a middle layer of the tank 260 and is recycled through the intermediary outlet 268 via the pump 232 back to the inlet 241 of the vessel 242 for further treatment.

The fluid at the bottom of the settling tank 260 is primarily a mixture of solids (if present) and water. This mixture is pumped through the bottom outlet 266 into the waste storage tank 261 by the pump 262.

Figure 5:
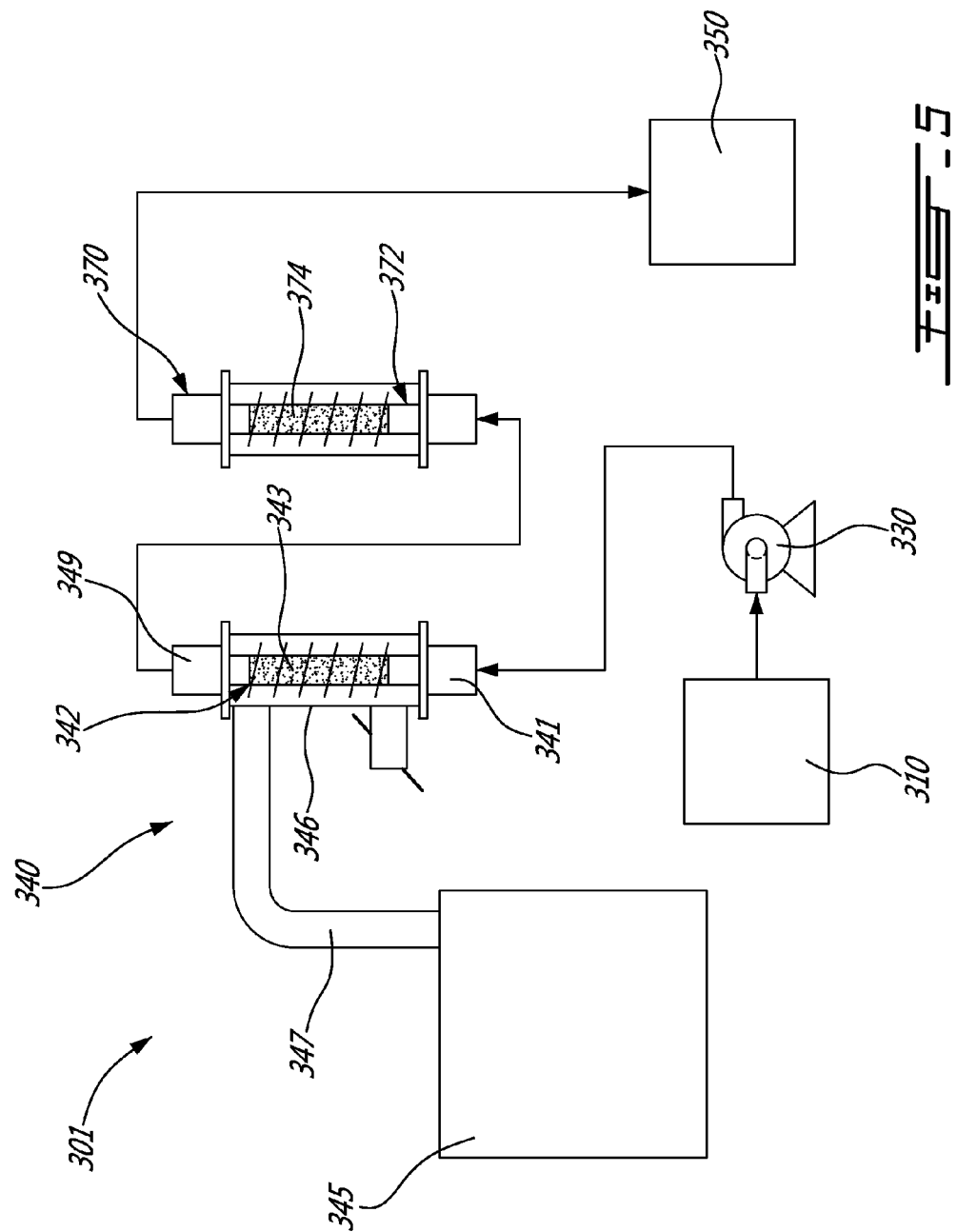
FIG. 5 is a schematic representation of a microwave reactor system for breaking emulsions according to another embodiment of the invention.

Referring to FIG. 5, a microwave reactor system 301 according to another particular embodiment is shown. The system 301 includes a pump 330 in fluid communication with a source 310 of emulsion, such as for example a storage tank, and with a microwave reactor 340.

The reactor 340 includes a vessel 342 made of a material letting microwaves passed therethrough and having an inlet 341 in fluid communication with the pump 330. The vessel 342 contains a packed carbon bed 343 and is located inside a microwave applicator 346 which receives microwaves from a microwave source 345 through a waveguide 347. The vessel 342 also includes an outlet 349 in fluid communication with an adsorber 370.

The adsorber 370 includes an internal vessel 372 which contains a packed carbon bed 374, and is in fluid communication with a collecting element 350, such as for example a tank.

In a particular embodiment, the reactor 340 is used to break an oil-in-water emulsion and to destroy most of the organics in the water. The remaining water-soluble organics are then removed by the adsorber 370. The use of the adsorber 370 may reduce the microwave energy requirements of the reactor 340, e.g. to effectively clean bilge water.

Figure 6:
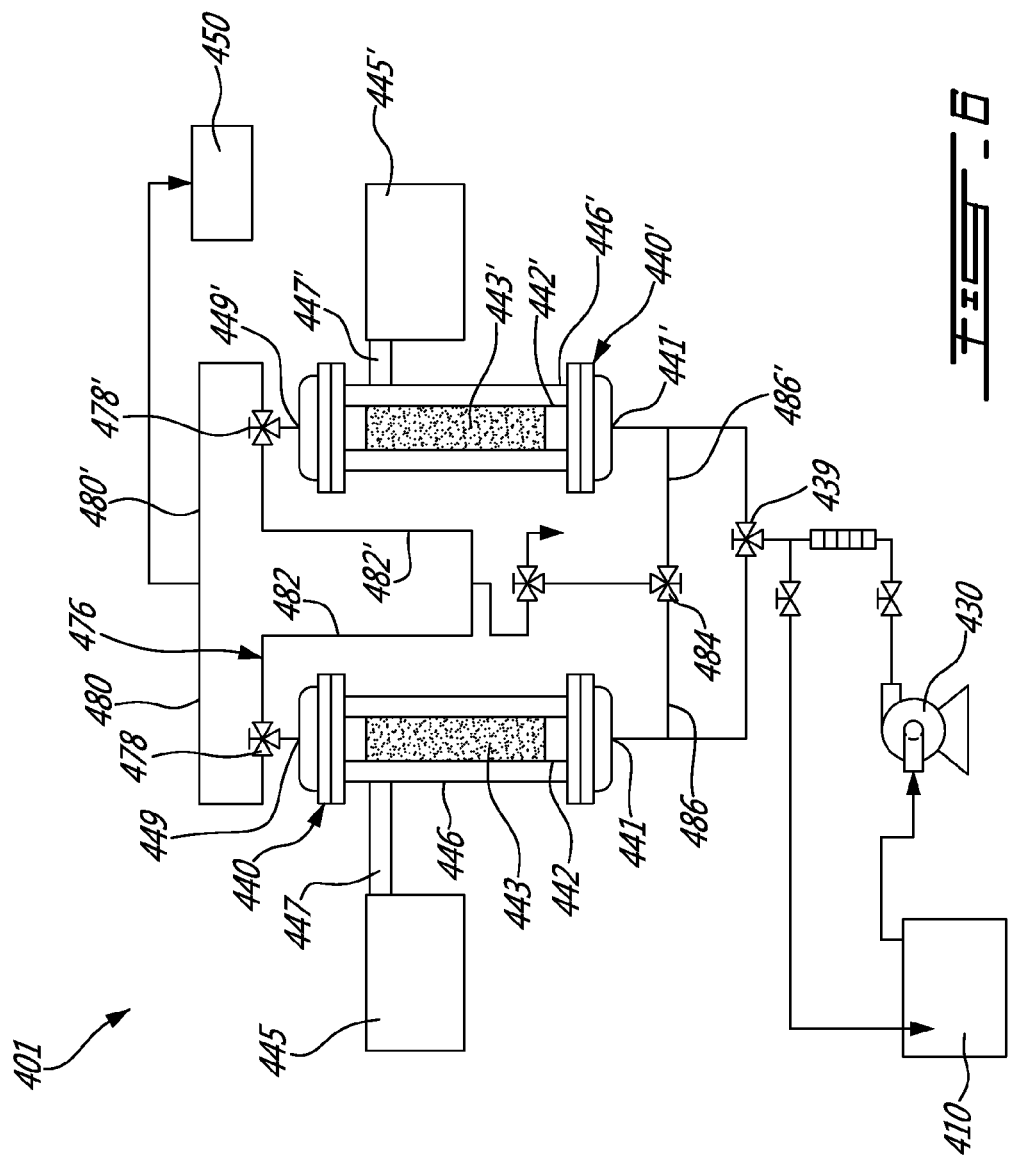
FIG. 6 is a schematic representation of a microwave reactor system for breaking emulsions according to yet another embodiment of the invention.

Referring to FIG. 6, a microwave reactor system 401 according to yet another particular embodiment is shown. The system 401 includes a pump 430 in fluid communication with a source 410 of emulsion which defines the inlet of the system, such as for example a storage tank. The outlet of the tank is selectively connected to one of two reactor units 440, 440', through a valve 439.

Each reactor 440' includes a respective vessel 442, 442' made of a material letting microwaves passed therethrough and having a respective inlet 441, 441' in selective fluid communication with the pump 430 through the valve 439. The vessels 342, 342' each contain a packed carbon bed 443, 443' and are each located inside a respective microwave applicator 446, 446'. In the embodiment shown, each microwave applicator 446, 446' receives microwaves from a respective microwave source 445, 445' through a respective waveguide 447, 447'. In an alternate embodiment which is not shown, both applicators 446, 446' receive microwaves from the same source.

The system includes a connecting assembly 476, which allows the reactors 440, 440' to be selectively interconnected to each other and to the system inlet and outlet according to first and second alternate configurations. The connecting assembly 476 in the first configuration provides fluid communication between an outlet 449 of the first reactor 440 and the inlet 441' of the second reactor 440', between an outlet 449' of the second reactor 440' and the system outlet leading to a collecting element 450, such as a tank, and between the inlet 441 of the first reactor 440 and the emulsion source 410 through the pump 430. The connecting assembly 476 in the second configuration provides fluid communication between the outlet 449 of the first reactor 440 and the system outlet leading to the collecting element 450, between the outlet 449' of the second reactor 440'1 and the inlet 441 of the first reactor 440, and between the inlet 441' of the second reactor 440' and the emulsion source 410 through the pump 430.

In the embodiment shown, the connecting assembly 476 is a piping and valve system including the valve 439 providing selective fluid communication between the pump 430 and a selected one of the reactor inlets 441, 441', a first outlet valve 478 allowing selective fluid communication of the outlet 449 of the first vessel 442 with a first collecting line 480 leading to the collecting element 450 or with a first return line 482, a second valve 478' allowing selective fluid communication of the outlet 449' of the second vessel 442' with a second collecting line 480' leading to the collecting element or with a second return line 482', and a third valve 484 allowing selective fluid communication of the return lines 482, 482' with a first inlet line 486 leading to the inlet 441 of the first reactor 440 or with a second inlet line 486' leading to the inlet 441' of the second reactor 440'. Additional valves and/or lines may also be added for sampling purposes, to return the solution to the source of the emulsion, etc.

Microwave energy regenerates saturated activated carbon in an adsorber very effectively, but regeneration is typically performed while the adsorber is not in use. It has been shown that microwaves could destroy the organic compounds adsorbed onto the carbon during regeneration. Thus, by using each reactor 440, 440' alternatively as a microwave reactor and as an adsorber, the emulsion breaking process can be continuous while allowing regeneration of the carbon bed of the reactor exposed to the microwaves.

In use, the solution is circulated from the system inlet or solution source 410 to the inlet 441 of the first reactor 440 by the pump 430, through the first packed carbon bed 443 while receiving microwaves from the first applicator 446, then through the outlet 449 of the first reactor 440, the first return line 482, the second inlet line 486' and to the inlet 441' of the second reactor 440'. The second microwave source 245' is turned off so that the second reactor 440' acts as an adsorber. The solution is circulated through the packed carbon bed 443' of the second reactor 440' then to the system outlet and collecting element 450 through the second collecting line 480'.

After a given time period, when the carbon of the packed bed 443' of the second reactor 440' needs to be regenerated, the first microwave source 245 is powered off and the second microwave source 245' is powered on. The configuration of the connecting assembly 476 is changed such that the solution is now circulated from the system inlet or solution source 410 to the inlet 441' of the second reactor 440' by the pump 430, through the second packed carbon bed 443' while receiving microwaves from the second applicator 446', then through the outlet 449' of the second reactor 440', the second return line 482', the first inlet line 486 and to the inlet 441 of the first reactor 440, which now acts as the adsorber. The solution is then circulated through the packed carbon bed 443 of the first reactor 440 and to the system outlet and collecting element 450 through the first collecting line 480.

The systems and methods described herein thus allow for the effective breaking of emulsions such as oil-water emulsions and oil-water-solid emulsions in their respective components, which can be applied to emulsions of various sources, including emulsions produced by refinery processes, found in bilge water and found in tailing ponds. For example, the reactors and methods may allow for the oil concentration in bilge water to be reduced from 100-10,000 ppm to below the 15 ppm discharge limit.

The systems and methods described herein overcome a common disadvantage of two-phase flow in filtration or packed beds, which tends to produce blockage. Due to the agitation and fluidization of the packed bed by the microwaves the emulsion contacts the fluidized activated carbon without blocking the packed bed. Furthermore, sparks generated within the activated carbon may help to break the emulsion and may also act as a type of catalyst for breaking the emulsion.

The embodiments of the invention described above are intended to be exemplary. Those skilled in the art will therefore appreciate that the foregoing description is illustrative only, and that various alternate configurations and modifications can be devised without departing from the spirit of the present invention. For example, elements from different embodiments may be combined. Other modifications are also possible. Accordingly, the present invention is intended to embrace all such alternate configurations, modifications and variances which fall within the scope of the appended claims.

The invention claimed is:

1. A process for breaking an emulsion containing at least oil and water, the process comprising:
   circulating the emulsion through a packed bed comprising activated carbon;
   exposing the emulsion to microwaves as it is circulated through the packed bed to produce a treated mixture;
   after applying the microwaves, circulating the treated mixture from the packed bed to a collecting element and allowing the treated mixture to settle in the collecting element; and
   extracting a middle portion of the treated mixture from the collecting element and recirculating the middle portion to the packed bed for further treatment.

2. The process of claim 1, further comprising blanketing the collecting element with an inert atmosphere.

3. The process of claim 1, further comprising further exposing the treated mixture to microwaves within the collecting element.

4. The process of claim 1, wherein the packed bed is a first packed bed, the process further comprising, after exposing the emulsion to the microwaves, circulating the treated mixture from the packed bed through a second packed bed comprising activated carbon.

5. The process of claim 4, wherein circulating the treated mixture through the second packed bed is done without exposing the second packed bed to microwaves.

6. The process of claim 5, further comprising, after a predetermined period of time, stopping circulation of the emulsion through the first packed bed and stopping exposition of the first packed bed to the microwaves, circulating the emulsion through the second packed bed, exposing the emulsion to microwaves as it is circulated through the second packed bed to produce the treated mixture, and circulating the treated mixture from the second packed bed through the first packed bed without exposing the first packed bed to microwaves.

* * * * *